United States Patent
Shiroishi et al.

(10) Patent No.: US 11,905,113 B2
(45) Date of Patent: Feb. 20, 2024

(54) ARTICLE TRANSPORT FACILITY

(71) Applicant: Daifuku Co., Ltd., Osaka (JP)

(72) Inventors: Keisuke Shiroishi, Hinocho (JP); Hiroshi Sakata, Hinocho (JP); Yoshinari Wada, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 123 days.

(21) Appl. No.: 17/833,294

(22) Filed: Jun. 6, 2022

(65) Prior Publication Data
US 2022/0388771 A1 Dec. 8, 2022

(30) Foreign Application Priority Data
Jun. 7, 2021 (JP) .................................. 2021-095238

(51) Int. Cl.
B65G 1/04 (2006.01)
B65G 17/20 (2006.01)
B65G 19/02 (2006.01)

(52) U.S. Cl.
CPC ......... B65G 1/0457 (2013.01); B65G 1/0407 (2013.01); B65G 17/20 (2013.01); B65G 19/025 (2013.01)

(58) Field of Classification Search
CPC ...... B65G 1/04; B65G 1/0457; B65G 1/0407; B65G 17/19; B65G 19/025
USPC ............................................. 198/678.1, 681
See application file for complete search history.

(56) References Cited

U.S. PATENT DOCUMENTS

| | | | | |
|---|---|---|---|---|
| 4,633,998 A * | 1/1987 | Norfolk | ................. | B65G 35/08 198/803.2 |
| 4,691,642 A * | 9/1987 | Creissels | ................. | B61B 7/045 104/115 |
| 6,409,451 B1 * | 6/2002 | Fallin | ..................... | B65G 47/82 198/433 |
| 8,807,328 B2 * | 8/2014 | Schurba | .............. | B05B 13/0452 198/346.3 |
| 2012/0067704 A1 * | 3/2012 | Nakagawa | ........ | H01L 21/67733 198/678.1 |
| 2017/0137221 A1 * | 5/2017 | Koide | .................. | B65G 1/0492 |
| 2018/0076078 A1 * | 3/2018 | Tanaka | ............. | H01L 21/67769 |
| 2020/0251366 A1 * | 8/2020 | Wada | ................ | H01L 21/67718 |
| 2022/0363529 A1 * | 11/2022 | Iwata | ..................... | B66F 9/141 |

FOREIGN PATENT DOCUMENTS

| | | | | |
|---|---|---|---|---|
| DE | 10 2008 012 408 A1 | * | 10/2008 | ............. B65G 49/07 |
| JP | 202066499 A | | 4/2020 | |
| KR | 20210133160 | * | 11/2021 | ............... B65G 1/04 |
| KR | 20220026360 | * | 3/2022 | ........... B65G 1/0457 |

* cited by examiner

*Primary Examiner* — James R Bidwell
(74) *Attorney, Agent, or Firm* — The Webb Law Firm (57) ABSTRACT

An upper shelf section of a holding rack includes an upper placement section fixed to a ceiling. A lower shelf section of the holding rack includes: a fixed support fixed to the upper shelf section, a lower placement section supported by the fixed support so as to be capable of advancing and retreating relative to a travel rail as viewed in a vertical direction; and a drive transmission mechanism drivable by a rack drive mechanism of a transport vehicle to cause the lower placement section to advance and retreat. The lower placement section is positioned directly below the upper placement section while in a retreated position, and is positioned directly below the travel rail while in an advanced position. The lower placement section is below a lower end of the transport vehicle.

9 Claims, 3 Drawing Sheets

ARTICLE TRANSPORT FACILITY

CROSS-REFERENCE TO RELATED APPLICATION

This application claims priority to Japanese Patent Application No. 2021-095238 filed Jun. 7, 2021, the disclosure of which is hereby incorporated by reference in its entirety.

BACKGROUND OF THE INVENTION

1. Field of the Invention

The present invention relates to an article transport facility that includes a travel rail on a ceiling, a transport vehicle that travels along the travel rail and transport an article, and a holding rack that is arranged adjacent to the travel rail and holds the article.

2. Description of the Related Art

JP 2020-66499A (hereinafter, "Patent Document 1") discloses an example of this kind of article transport facility. The following "Background Art" and "Problem to be Solved by the Invention" will cite in brackets reference numerals used in Patent Document 1.

An article transport facility (1) in Patent Document 1 includes a holding rack (6) having an upper shelf section suspended from a ceiling, and a lower shelf section suspended from the upper shelf section. The lower shelf section has a lower placement section (64) supported in such a manner as to be capable of advancing and retreating relative to a travel rail (2), and a drive transmission mechanism (66) that is driven by a rack drive mechanism provided in a transport vehicle (3) to cause the lower placement section (64) to advance and retreat.

The rack drive mechanism of the transport vehicle (3) in the above article transport facility (1) includes a transport vehicle-side coupler (37), and a drive source (38) for driving the transport vehicle-side coupler (37) to rotate. The drive transmission mechanism (66) of the lower shelf section includes a rack-side coupler (71) that is coupled to the transport vehicle-side coupler (37) in such a manner as to follow the transport vehicle-side coupler (37) to rotate, and a conversion mechanism for converting the rotation of the rack-side coupler to linear motion and causing the lower placement section (64) to advance and retreat.

The transport vehicle-side coupler (37) and the rack-side coupler (71) of the article transport facility (1) in Patent Document 1 rotate about respective vertical rotation axes. The conversion mechanism of the drive transmission mechanism (66) includes a rack (64a) that is provided on a side face of the lower placement section (64) along the direction in which the lower placement section (64) advances and retreats, a pinion gear (73) meshing with this rack, and a joint shaft (72) that extends in the vertical direction and joins the pinion gear (73) to the rack-side coupler (71) such that the pinion gear (73) and the rack-side coupler (71) rotate integrally.

In the above article transport facility (1), the rack-side coupler (71) and the pinion gear (73) are thus joined by the joint shaft (72) in such a manner as to be spaced apart in the vertical direction and integrally rotate about a vertical rotation axis. There is therefore a problem in that the drive transmission mechanism (66) for causing the lower placement section (64) to advance and retreat is likely to increase in size in the vertical direction.

SUMMARY OF THE INVENTION

In vie of the foregoing, there is a desire for realization of an article transport facility that makes it easy to keep short the vertical length of the drive transmission mechanism for causing the lower placement section to advance and retreat.

A characteristic configuration of an article transport facility in view of the above lies in
an article transport facility including:
a travel rail on a ceiling;
a transport vehicle configured to travel along the travel rail and transport an article; and
a holding rack adjacent to the travel rail and configured to hold the article,
the transport vehicle including:
a holder configured to suspend and hold the article;
a lift mechanism configured to move the holder in a vertical direction;
a lateral movement mechanism configured to move the holder in a width direction, which is, as viewed in the vertical direction, a direction intersecting a travel direction parallel to the travel rail; and
a rack drive mechanism,
the holding rack including:
an upper shelf section suspended from the ceiling; and
a lower shelf section suspended from the upper shelf section,
the upper shelf section including an upper placement section which is fixed to the ceiling and on which the article is placeable,
the lower shelf section including:
a fixed support fixed to the upper shelf section;
a lower placement section on which the article is placeable, the lower placement section being supported by the fixed support in such a manner as to be capable of advancing and retreating in an advance-retreat direction, which is a direction in which the lower placement section moves toward and away from the travel rail as viewed in the vertical direction; and
a drive transmission mechanism drivable by the rack drive mechanism to cause the lower placement section to advance and retreat,
wherein the lower placement section is positioned directly below the upper placement section while in a retreated position, in which the lower placement section is away from the travel rail,
the lower placement section is positioned directly below the travel rail while in an advanced position, in which the lower placement section is close to the travel rail,
the lower placement section is below a lower end of the transport vehicle, and
the rack drive mechanism is below a lower end of the article held by the holder positioned at an uppermost side within a range within which the holder is moved by the lift mechanism.

According to this characteristic configuration, the lower placement section, which advances and retreats in the advance-retreat direction, is below the lower end of the transport vehicle. Further, the rack drive mechanism is below the lower end of the article that is held by the holder positioned at the uppermost side in the movable range of the holder that is moved by the lift mechanism. This configuration makes it easy to arrange the drive transmission mechanism, which is driven by the rack drive mechanism to cause the lower placement section to advance and retreat, at a position close to the lower placement section in the vertical direction. It is therefore easy to keep short the vertical length of the drive transmission mechanism for causing the lower placement section to advance and retreat.

Another characteristic configuration of an article transport facility in view of the above lies in an article transport facility including:
a travel rail on a ceiling;
a transport vehicle configured to travel along the travel rail and transport an article; and
a holding rack adjacent to the travel rail and configured to hold the article,
the transport vehicle including:
a holder configured to suspend and hold the article;
a lift mechanism configured to move the holder in a vertical direction;
a lateral movement mechanism configured to move the holder in a width direction, which is, as viewed in the vertical direction, a direction intersecting a travel direction parallel to the travel rail; and
a rack drive mechanism,
the holding rack including:
an upper shelf section suspended from the ceiling; and
a lower shelf section suspended from the upper shelf section,
the upper shelf section including an upper placement section which is fixed to the ceiling and on which the article is placeable,
the lower shelf section including:
a fixed support fixed to the upper shelf section;
a lower placement section on which the article is placeable, the lower placement section being supported by the fixed support in such a manner as to be capable of advancing and retreating in an advance-retreat direction, which is a direction in which the lower placement section moves toward and away from the travel rail as viewed in the vertical direction; and
a drive transmission mechanism drivable by the rack drive mechanism to cause the lower placement section to advance and retreat,
wherein the lower placement section is positioned directly below the upper placement section while in a retreated position, in which the lower placement section is away from the travel rail,
the lower placement section is positioned directly below the travel rail while in an advanced position, in which the lower placement section is close to the travel rail,
the drive transmission mechanism includes a rack-side coupler facing one side corresponding to the travel rail in the advance-retreat direction,
the rack drive mechanism includes:
a transport vehicle-side coupler facing another side corresponding to the holding rack in the advance-retreat direction; and
a drive source configured to drive the transport vehicle-side coupler to rotate about a rotation axis parallel to the advance-retreat direction,
the rack-side coupler and the transport vehicle-side coupler are configured to be coupled to each other while facing each other in the advance-retreat direction in response to the transport vehicle being stopped at a stop position that is set in correspondence with the holding rack,
the rack-side coupler is configured to be rotated about a rotation axis parallel to the advance-retreat direction by driving force transmitted from the drive source via the transport vehicle-side coupler, and the drive transmission mechanism further includes:
a conversion mechanism configured to convert rotation of the rack-side coupler to linear motion in the advance-retreat direction;
an output member configured to be moved linearly by the conversion mechanism; and
a joint joining the output member to the lower placement section.

According to this characteristic configuration, the rack-side coupler of the drive transmission mechanism rotates about a rotation axis parallel to the advance-retreat direction. Further, the output member of the drive transmission mechanism is linearly moved in the advance-retreat direction by the conversion mechanism. This configuration makes it easy to keep short the length of the drive transmission mechanism in the vertical direction, which is orthogonal to the advance-retreat direction.

Furthermore, according to this characteristic configuration, the transport vehicle-side coupler of the rack drive mechanism rotates about the rotation axis parallel to the advance-retreat direction. This configuration makes it easy to keep short the length of the rack drive mechanism in the vertical direction, which is orthogonal to the advance-retreat direction.

DETAILED DESCRIPTION OF PREFERRED EMBODIMENTS

The following is a description of an article transfer facility 100 according to an embodiment, with reference to the drawings. The article transport facility 100 includes travel rails 1 installed on a ceiling C, a transport vehicle 2 that travels along the travel rails 1 and transports articles W, and a holding rack 3 that is arranged adjacent to the travel rails 1 and holds the articles W, as shown in FIGS. 1 and 2.

The following description will use three directions that intersect each other, namely a "travel direction X", a "width direction Y", and a "vertical direction Z". The travel direction X is a direction parallel to the travel rails 1. The width direction Y is a direction that intersects the travel direction X as viewed in the vertical direction Z.

Figure 1:
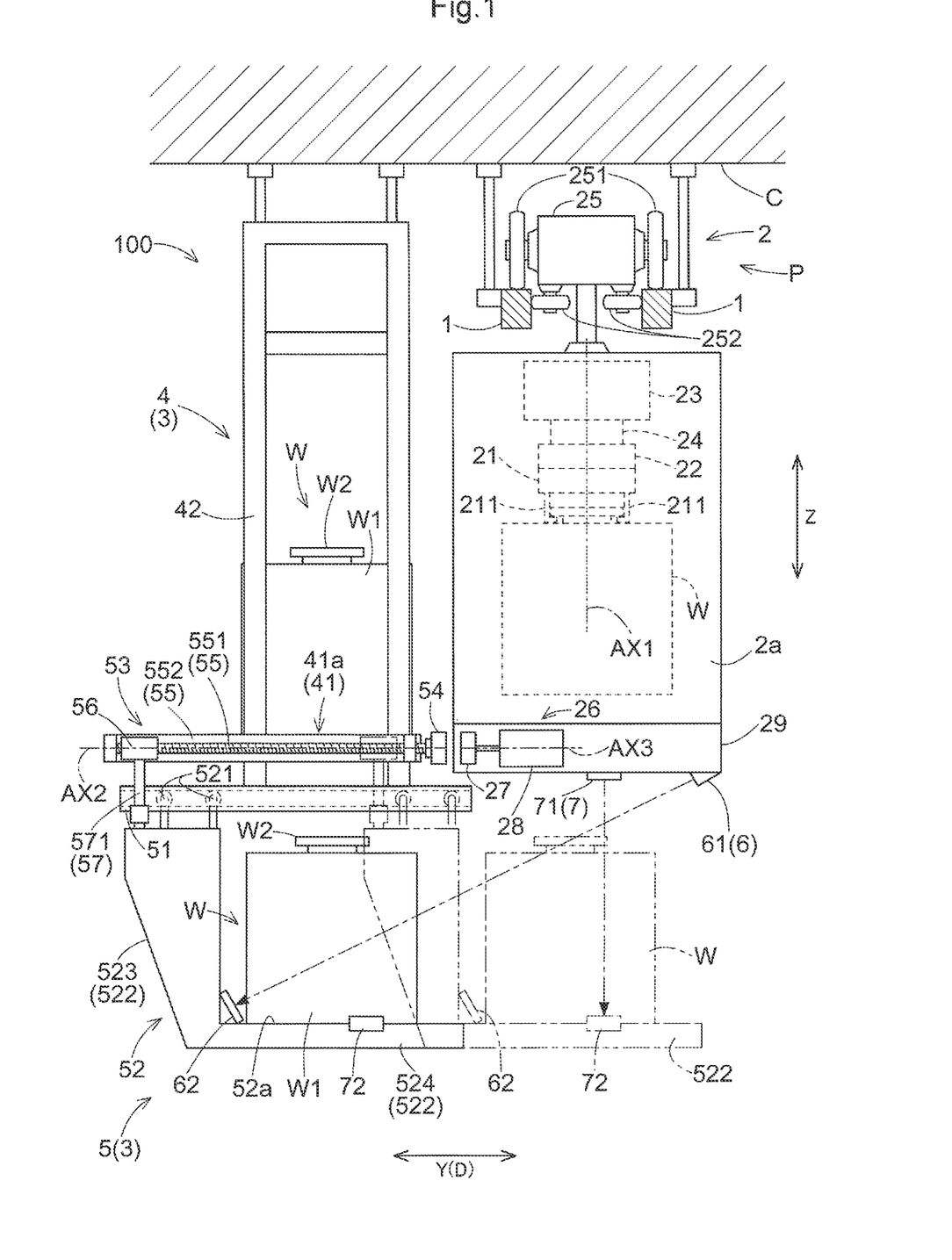
FIG. 1 shows an article transport facility according to an embodiment as viewed in a travel direction.
Figure 2:
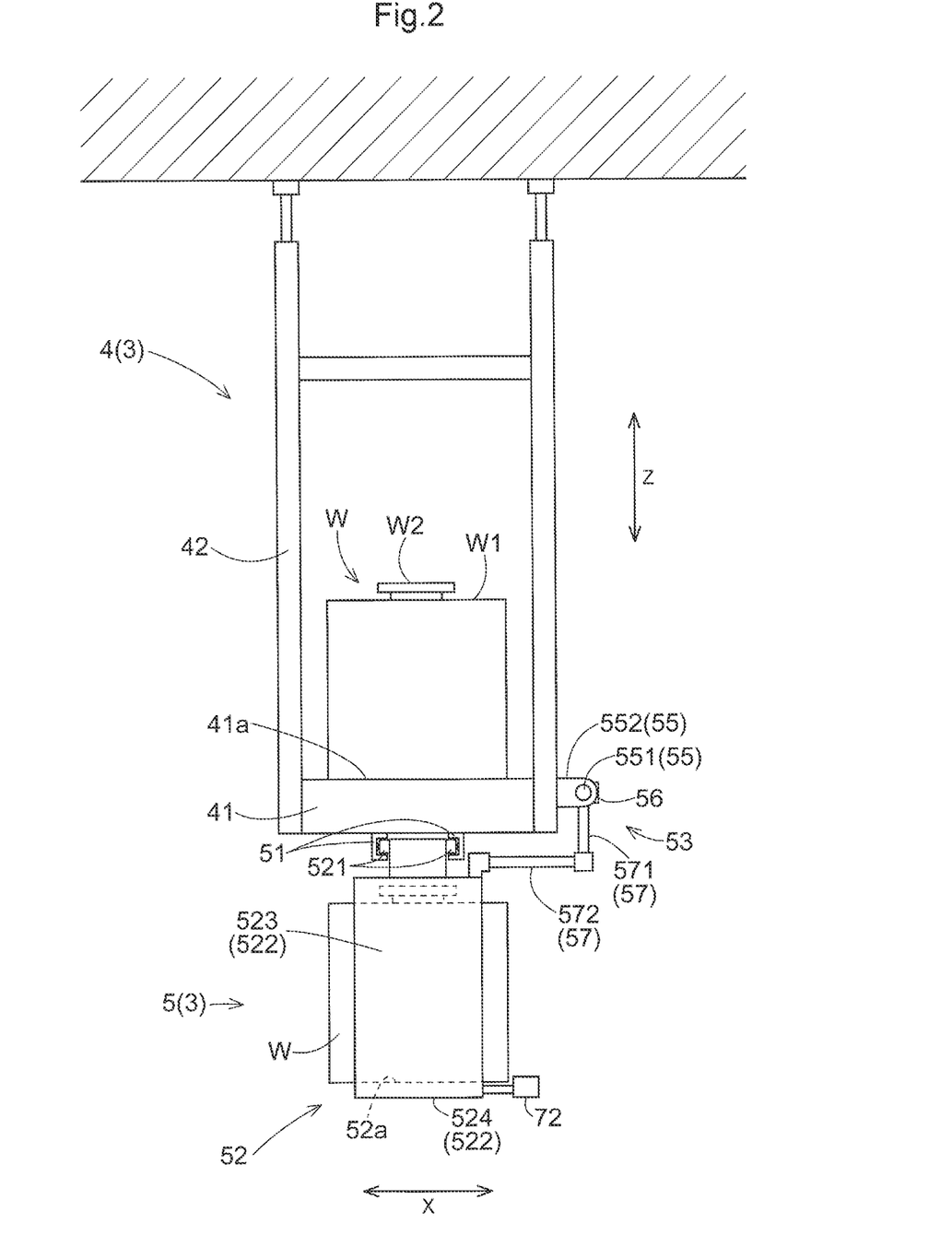
FIG. 2 shows a holding rack of the article transport facility according to the embodiment as viewed in a width direction.

The travel rails 1 extend in the travel direction X in such a manner as to form a travel path of the transport vehicle 2, as shown in FIG. 1. Two travel rails 1 are arranged while being spaced apart in the width direction Y with a fixed spacing in the present embodiment.

The transport vehicle 2 has a holder 21 for holding an article W in a suspended manner, a lift mechanism 22 for moving the holder 21 in the vertical direction Z, and a lateral movement mechanism 23 for moving the holder 21 in the width direction Y. The transport vehicle 2 in the present embodiment also has a rotation mechanism 24 for rotating the holder 21 about a first rotation axis AX1, which is a rotation axis parallel to the vertical direction Z, and a traveling section 25 that travels in the travel direction X.

The traveling section 25 includes a plurality of traveling wheels 251 that roll on the travel rails 1, a plurality of guide wheels 252 for restricting movement of the traveling section 25 in the width direction Y, and a travel motor 253 (see FIG. 3) for driving at least one of the traveling wheels 251 to rotate. Each of the plurality of traveling wheels 251 in the present embodiment is supported rotatably about a rotation axis parallel to the width direction Y. The plurality of traveling wheels 251 are separated in the width direction Y such that the traveling wheels 251 roll on upper surfaces of the pair of travel rails 1. Each of the plurality of guide wheels 252 in the present embodiment are supported rotatably about a rotation axis parallel to the vertical direction Z. The plurality of guide wheels 252 are separated in the width direction Y such that the guide wheels 252 come into contact with the pair of travel rails 1 from the inner side in the width direction Y. The traveling section 25 in the present embodiment travels along the travel rails 1 as a result of at least one pair of traveling wheels 251 separated in the width direction Y being driven to rotate by driving force of the travel motor 253.

The holder 21 in the present embodiment includes a pair of holding claws 211 for holding an article W, and a holder motor 212 (see FIG. 3) for operating the pair of holding claws 211. The two holding claws 211 approach each other and move away from each other in a direction orthogonal to the vertical direction Z due to driving force of the holder motor 212. The holder 21 enters a holding state, i.e., a state of holding an article W, as a result of the two holding claws 211 approaching each other. Conversely, the holder 21 enters a non-holding state, i.e., a state of not holding an article W, as a result of the two holding claws 211 moving away from each other.

The article W in the present embodiment has an accommodating section W1 and a flange section W2. The accommodating section W1 has a box shape. The flange section W2 can be supported by the pair of holding claw 211 of the holder 21. The flange section W2 in the present embodiment protrudes upward from the accommodating section W1 and then extends in a direction orthogonal to the vertical direction Z. The article W in this example is a container called FOUP (Front Opening Unified Pod) with an openable front face for accommodating a plurality of semiconductor wafers.

The lift mechanism 22 in the present embodiment includes a lift motor 221 (see FIG. 3) for moving the holder 21 in the vertical direction Z. In the present embodiment, a belt with a leading end portion joined to the holder 21 is wound around a pulley (the belt and the pulley are not shown in the figures), and the holder 21 ascends and descends as a result of the pulley being driven to rotate by driving force of the lift motor 221.

The rotation mechanism 24 in the present embodiment includes a rotation motor 241 (see FIG. 3) for rotating the holder 21 about the first rotation axis AX1. The rotation mechanism 24 supports the lift mechanism 22 such that the lift mechanism 22 can rotate about the first rotation axis AX1. The holder 21 in the present embodiment rotates about the first rotation axis AX1 via the lift mechanism 22 as a result of the lift mechanism 22 being rotated about the first rotation axis AX1 by driving force of the rotation motor 241.

The lateral movement mechanism 23 in the present embodiment includes a lateral movement motor 231 (see FIG. 3) for moving the holder 21 in the width direction Y. The lateral movement mechanism 23 supports the rotation mechanism 24 such that the rotation mechanism 24 can move in the width direction Y. The holder 21 in the present embodiment moves in the width direction Y via the lift mechanism 22 supported by the rotation mechanism 24, as a result of the rotation mechanism 24 being moved in the width direction Y by driving force of the lateral movement motor 231.

The transport vehicle 2 includes a rack drive mechanism 26, as shown in FIG. 1. The rack drive mechanism 26 is below a lower end of an article W (see an article W indicated by broken lines in FIG. 1) that is held by the holder 21 positioned at the uppermost side in the movable range of the holder 21 that is moved by the lift mechanism 22. In other words, the rack drive mechanism 26 is below the lower end of the article W at an upper-limit article position, which is a position of the article W held by the holder 21 positioned at an upper limit position in the movable range of the holder 21 that is raised and lowered by the lift mechanism 22. The rack drive mechanism 26 in the present embodiment is attached to a lower end portion of a cover body 2*a* of the transport vehicle 2. Note that a detailed configuration of the rack driving mechanism 26 will be described later.

The cover body 2*a* covers the article W held by the holder 21. The cover body 2*a* has a shape with which the article W held by the holder 21 does not interfere while the lift mechanism 22 moves the holder 21 in the vertical direction Z, and while the lateral movement mechanism 23 moves the holder 21 in the width direction Y. The cover body 2*a* in the present embodiment covers the article W held by the holder 21 from two sides in the travel direction X and from above while the holder 21 is positioned at the uppermost side in the movable range of the holder 21 that is moved by the lift mechanism 22. Further, the cover body 2*a* in the present embodiment is supported while being suspended from the traveling section 25.

The holding rack 3 includes an upper shelf section 4 suspended from the ceiling C, and a lower shelf section 5 suspended from the upper shelf section 4, as shown in FIGS. 1 and 2.

The upper shelf section 4 has an upper placement section 41. The upper placement section 41 is for receiving an article W placed thereon. The upper placement section 41 in the present embodiment has an upper placement surface 41*a* that faces upward, and an article W is placed on this upper placement section 41*a*. The upper placement surface 41*a* in this example has a flat-face portion orthogonal to the vertical direction Z.

The upper placement section 41 is fixed to the ceiling C. The upper placement section 41 in the present embodiment is fixed to the ceiling C via a fixing section 42 that extends upward from the upper placement section 41.

The lower shelf section 5 has fixed supports 51, a lower placement section 52, and a drive transmission mechanism 53.

The fixed supports 51 are fixed to the upper shelf section 4. The fixed supports 51 in the present embodiment are detachably attached to the upper shelf section 4. The fixed supports 51 in this example are attached with bolts or the like to a lower surface of the upper placement section 41 of the upper shelf section 4. In the present embodiment, two fixed supports 51 are spaced apart in the travel direction X and extend in the width direction Y.

The lower placement section 52 is for receiving an article W placed thereon. The lower placement section 52 in the present embodiment has a lower placement surface 52*a* that faces upward, and an article W is placed on this lower placement surface 52*a*. The lower placement surface 52*a* in this example has a flat-face portion orthogonal to the vertical direction Z.

The lower placement section 52 is supported by the fixed supports 51 in such a manner as to advance and retreat in an advance-retreat direction D, in which the lower placement section 52 approaches and moves away from the travel rails 1 as viewed in the vertical direction Z. The lower placement section 52 in the present embodiment has a plurality of wheels 521 and a body 522. Note that the advance-retreat direction D in the present embodiment is parallel to the width direction Y.

The plurality of wheels 521 are attached to the body 522. The plurality of wheels 521 roll in the advance-retreat direction D on the pair of fixed supports 51. Each of the plurality of traveling wheels 521 in the present embodiment is rotatable about a rotation axis parallel to the travel direction X. The plurality of wheels 521 are separated in the travel direction X in such a manner as to roll on rolling surfaces that are formed on the two fixed supports 51 and face upward. In this example, two pairs of wheels 521, which are separated in the travel direction X, are separated from each other in the width direction Y (advance-retreat direction D). Namely, a total of four wheels 521 are provided.

The body 522 advances and retreats in the advance-retreat direction D as a result of the plurality of wheels 521 rolling on the pair of fixed supports 51 in the advance-retreat direction D. The body 522 in the present embodiment has a first extending portion 523 extending in the vertical direction Z, and a second extending portion 524 extending in the advance-retreat direction D. The plurality of wheels 521 are attached to the first extending portion 523. The second extending portion 524 includes the lower placement surface 52a. The second extending portion 524 in this example protrudes in the advance-retreat direction D from a lower end portion of the first extending portion 523. The plurality of wheels 521 are attached to an upper end portion of the first extending portion 523.

The lower placement section 52 is located directly below the upper placement section 41 while in a retreated position in which the lower placement section 52 has moved away from the travel rails 1, as shown in FIG. 1. Here, the "retreated position" refers to the lower placement section 52 being located at the farthest position from the travel rails 1 in the movable range of the lower placement section 52 in the advance-retreat direction D (see the lower placement section 52 indicated by solid lines in FIG. 1). While the lower placement section 52 is located directly below the upper placement section 41, the area in which the lower placement surface 52a of the lower placement section 52 overlaps the upper placement surface 41a of the upper placement section 41 as viewed in the vertical direction Z is largest, compared with any other case.

The lower placement section 52 is located directly below the travel rails 1 while in an advanced position in which the lower placement section 52 is close to the travel rails 1. Here, the "advanced position" refers to the lower placement section 52 being located at a position closest to the travel rails 1 in the movable range of the lower placement section 52 in the advance-retreat direction D (see the lower placement section 52 indicated by long-dash double-dot lines in FIG. 1). While the lower placement section 52 is located directly below the travel rails 1, the area in which the lower placement surface 52a of the lower placement section 52 overlaps the travel rails 1 as viewed in the vertical direction Z is largest, compared with any other case.

The lower placement section 52 is located below the lower end of the transport vehicle 2. In this example, the upper end of the article W placed on the lower placement section 52 is located below the lower end of the rack drive mechanism 26 of the transport vehicle 2. Further, the upper ends of the wheels 521 of the lower placement section 52 are also located below the lower end of the rack drive mechanism 26 of the transport vehicle 2.

The drive transmission mechanism 53 is driven by the rack drive mechanism 26 of the transport vehicle 2 to cause the lower placement section 52 to advance and retreat. The drive transmission mechanism 53 in the present embodiment includes a rack-side coupler 54, a conversion mechanism 55, an output member 56, and a joint 57.

The rack-side coupler 54 is arranged in such a manner as to face one side corresponding to the holder travel rails 1 in the advance-retreat direction D. The rack-side coupler 54 in the present embodiment is supported rotatably about a second rotation axis AX2, which is a rotation axis parallel to the advance-retreat direction D.

The conversion mechanism 55 converts the rotation of the rack-side coupler 54 to linear motion in the advance-retreat direction D. The conversion mechanism 55 in the present embodiment includes a ball screw 551 having a screw thread, and a support member 552 rotatably supporting the ball screw 551.

The ball screw 551 extends in the advance-retreat direction D. The ball screw 551 is joined to the rack-side coupler 54 in such a manner as to rotate integrally therewith about the second rotation axis AX2. In the present embodiment, the rack-side coupler 54 is joined to an end portion of the ball screw 551 on the side in the advance-retreat direction D on which the travel rails 1 are located.

The support member 552 in the present embodiment is fixed to the upper shelf section 4. The support member 552 in this example is fixed to the fixing section 42 of the upper placement section 41 while protruding toward one side in the width direction Y relative to the fixing section 42.

The output member 56 is linearly moved by the conversion mechanism 55. The output member 56 in the present embodiment is screwed with a threaded portion of the ball screw 551. For this reason, the output member 56 linearly moves in the advance-retreat direction D as a result of the ball screw 551 rotating about the second rotation axis AX2, in accordance with the direction of this rotation and the orientation of the threaded portion.

The joint 57 joins the output member 56 to the lower placement section 52. The joint 57 has a shape that does not interfere with the upper shelf section 4, the fixed supports 51, and so on, while the lower placement section 52 is advancing and retreating in the advance-retreat direction D. The joint 57 in the present embodiment includes a first joint 571 extending in the vertical direction Z, and a second joint 572 extending in the travel direction X, as shown in FIG. 2.

In the example shown in FIG. 2, an upper end portion of the first joint 571 is joined to the output member 56. An end portion of the second joint 572 on one side (right side in FIG. 2) in the travel direction X is joined to a lower end portion of the first joint 571. An end of the second joint 572 on the other side (left side in FIG. 2) in the travel direction X is joined to an upper end portion of the first extending portion 523 of the lower placement section 52. In other words, the second joint 572 in this example of the present embodiment is arranged in a space between the upper placement section 41 and the body 522 of the lower placement section 52 in the vertical direction Z. The drive transmission mechanism 53 in the present embodiment is thus at least partially arranged in a space between the upper placement section 41 and the lower placement section 52 in the vertical direction Z.

The rack drive mechanism 26 in the present embodiment includes a transport vehicle-side coupler 27 and a drive source 28, as shown in FIG. 1.

The transport vehicle-side coupler 27 is arranged in such a manner as to face one side corresponding to the holding rack 3 in the advance-retreat direction D. The transport vehicle-side coupler 27 is coupled to the rack-side coupler 54 while facing the rack-side coupler 54 in the advance-retreat direction D in response to the transport vehicle 2 being stopped at a stop position P, which is set in correspondence with the holding rack 3. That is, the transport vehicle-side coupler 27 is arranged such that the movement path of the transport vehicle-side coupler 27 when the transport vehicle 2 travels along the travel rails 1 overlaps the rack-side coupler 54 as viewed in the advance-retreat direction D. The transport vehicle-side coupler 27 in the present embodiment is supported rotatably about a third rotation axis AX3, which is a rotation axis parallel to the advance-retreat direction D. The transport vehicle-side coupler 27 and the rack-side coupler 54 in this example are magnet gears capable of being contactlessly coupled through magnetic force and transmitting driving force.

The drive source 28 drives the transport vehicle-side coupler 27 to rotate about the third rotation axis AX3. Upon the drive source 28 driving the transport vehicle-side coupler 27 to rotate with the transport vehicle-side coupler 27 coupled to the rack-side coupler 54, the rack-side coupler 54 is rotated by the driving force from the drive source 28 transmitted via the transport vehicle-side coupler 27. The output member 56 then moves in the advance-retreat direction D as a result of the conversion mechanism 55 converting the rotation of the rack-side coupler 54 to linear motion in the advance-retreat direction D. The lower placement section 52 joined to the output member 56 via the joint 57 then advances and retreats in the advance-retreat direction D. The rack drive mechanism 26 thus drives the drive transmission mechanism 53 via the transport vehicle-side coupler 27 and the rack-side coupler 54 that are coupled to each other. Note that the drive source 28 in this example is a motor.

The drive source 28 in the present embodiment is attached to the transport vehicle 2 via an attachment member 29. The attachment member 29 in the present embodiment is detachably attached to the transport vehicle 2. The attachment member 29 in this example is attached to a lower end portion of the cover body 2a of the transport vehicle 2 with a bolt or the like. The rack drive mechanism 26 in the present embodiment is thus detachably attached to the transport vehicle 2.

The article transport facility 100 in the present embodiment also includes an article detector 6, as shown in FIG. 1. The article detector 6 detects whether or not an article W is present on the lower placement section 52. The article detector 6 in the present embodiment includes a first transmitter/receiver 61. The first transmitter/receiver 61 includes a light projector for emitting light such as a laser beam to a first reflective member 62 arranged on the lower placement section 52, and a light receiver for receiving light reflected by the first reflective member 62.

If no article W is placed on the lower placement section 52, light emitted from the light projector of the first transmitter/receiver 61 is reflected by the first reflective member 62 and received by the light receiver of the first transmitter/receiver 61. On the other hand, if an article W is placed on the lower placement section 52, light emitted from the light projector of the first transmitter/receiver 61 is blocked by this article W and does not reach the first reflective member 62. Therefore, the light receiver of the first transmitter/receiver 61 does not receive light. The article detector 6 detects whether or not an article W is present on the lower placement section 52, based on whether or not the light receiver thus receives light. The article detector 6 in this example detects whether or not an article W is present on the lower placement section 52 if the lower placement section 52 is in the retreated position (see the lower placement section 52 indicated by solid lines in FIG. 1). In other words, in this example, the positions and angles of the first transmitter/receiver 61 and the first reflective member 62 are set such that light emitted from the light projector of the first transmitter/receiver 61 is reflected by the first reflective member 62 and received by the light receiver of the first transmitter/receiver 61 if the lower placement section 52 is in the retreated position.

The first transmitter/receiver 61 in the present embodiment is attached to the attachment member 29 for the rack drive mechanism 26. The article detector 6 in the present embodiment is thus attached to the rack drive mechanism 26. Further, the first reflective member 62 in the present embodiment is arranged at a position at which the first reflective member 62 does not interfere with an article W placed on the lower placement surface 52a of the lower placement section 52. The first reflective member 62 in the example shown in FIG. 1 is arranged in a space in the width direction Y between the first extending portion 523 of the lower placement section 52 and the article W placed on the lower placement surface 52a.

The article transport facility 100 in the present embodiment also includes an advance-retreat detector 7. The advance-retreat detector 7 detects at least either the lower placement section 52 being in the retreated position or the lower placement section 52 being in the advanced position. The advance-retreat detector 7 in the present embodiment includes a second transmitter/receiver 71. The second transmitter/receiver 71 includes a light projector for emitting light such as a laser beam to a second reflective member 72 arranged on the lower placement section 52, and a light receiver for receiving light reflected by the second reflective member 72.

If, in this example, the lower placement section 52 is in the advanced position (see the lower placement section 52 indicated by long-dash double-dot lines in FIG. 1), light emitted from the light projector of the second transmitter/receiver 71 is reflected by the second reflective member 72 and received by the light receiver of the second transmitter/receiver 71. On the other hand, if the lower placement section 52 is not in the advanced position, light emitted from the light projector of the second transmitter/receiver 71 is not emitted toward the second reflective member 72, and is not received by the light receiver of the second transmitter/receiver 71. The advance-retreat detector 7 detects the position of the lower placement section 52 in accordance with whether the light receiver thus receives light. The advance-retreat detector 7 in this example detects the lower placement section 52 being in the advanced position.

The second transmitter/receiver 71 in the present embodiment is attached to the attachment member 29 for the rack drive mechanism 26. The advance-retreat detector 7 in the present embodiment is thus attached to the rack drive mechanism 26. Further, the second reflective member 72 in the present embodiment is arranged at a position at which the second reflective member 72 does not interfere with an article W placed on the lower placement surface 52a of the lower placement section 52. The second reflective member 72 in the example shown in FIG. 2 is fixed to the second extending portion 524 of the lower placement section 52 in such a manner as to be located on the outer side in the travel direction X relative to the article W placed on the lower placement surface 52a.

Figure 3:
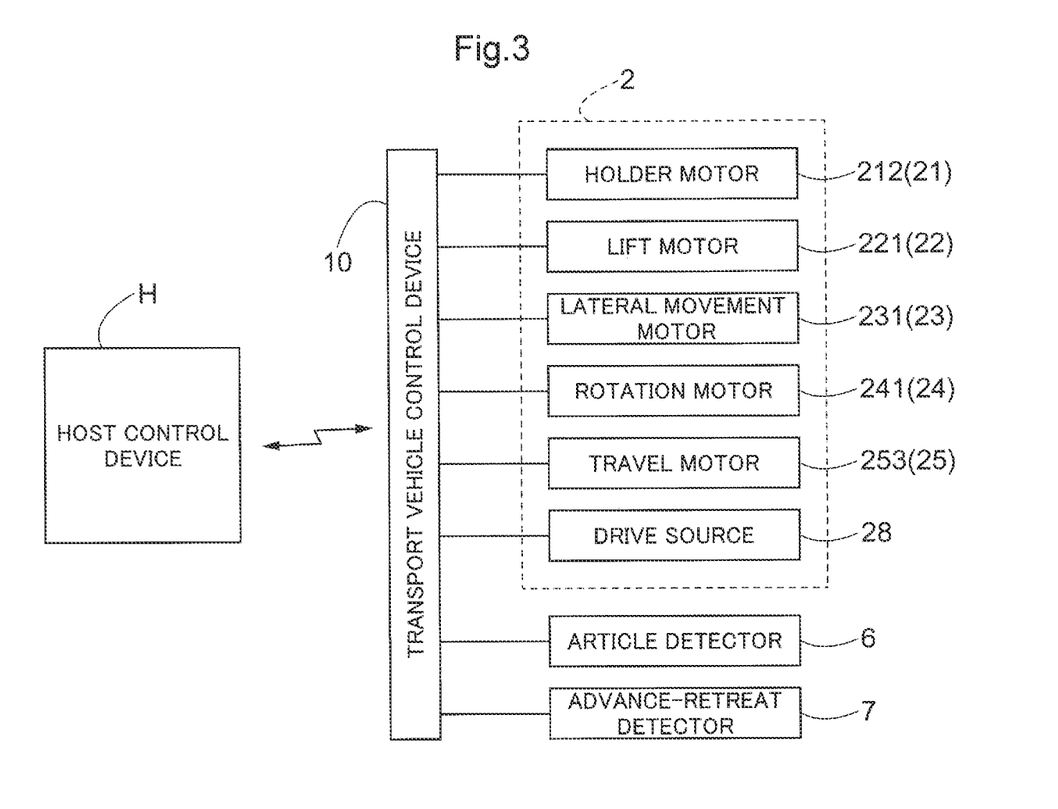
FIG. 3 is a block diagram illustrating a system configuration of the article transport facility according to the embodiment.

The article transport facility 100 includes a transport vehicle control device 10 for controlling the transport vehicle 2, and a host control device H that outputs instructions to the transport vehicle control device 10, as shown in FIG. 3.

The transport vehicle control device 10 is installed in the transport vehicle 2. The transport vehicle control device 10 in the present embodiment controls the holder 21, the lift mechanism 22, the lateral movement mechanism 23, the rotation mechanism 24, the traveling section 25, and the rack drive mechanism 26 of the transport vehicle 2. Specifically, the transport vehicle control device 10 is connected to the holder motor 212, the lift motor 221, the lateral movement motor 231, the rotation motor 241, the travel motor 253, and the drive source 28 such that signals (e.g., electrical signals) can be transmitted and received therebetween, and controls operations of these connected members.

The transport vehicle control device 10 in the present embodiment also controls the article detector 6. Specifically, the transport vehicle control device 10 causes the light projector of the first transmitter/receiver 61 of the article detector 6 to emit light such as a laser beam to the first reflective member 62. The transport vehicle control device 10 determines that no article W is placed on the lower placement section 52 if the light receiver of the first transmitter/receiver 61 detects light reflected by the first reflective member 62. On the other hand, the transport vehicle control device 10 determines that an article W is placed on the lower placement section 52 if the light receiver of the first transmitter/receiver 61 does not detect light emitted from the light projector of the first transmitter/receiver 61. If, for example, an article W is placed on the lower placement section 52 based on this determination, the transport vehicle control device 10 performs a control to prohibit transfer of an article W to this lower placement section 52, for example.

The transport vehicle control device 10 in the present embodiment also controls the advance-retreat detector 7. Specifically, the transport vehicle control device 10 causes the light projector of the second transmitter/receiver 71 of the advance-retreat detector 7 to emit light such as a laser beam. The transport vehicle control device 10 determines that the lower placement section 52 is in the advanced position if the light receiver of the second transmitter/receiver 71 detects light reflected by the second reflective member 72. On the other hand, the transport vehicle control device 10 determines that the lower placement section 52 is not in the advanced position if the light receiver of the second transmitter/receiver 71 does not detect light emitted from the light projector of the second transmitter/receiver 71. If, for example, the lower placement section 52 is not in the advanced position based on this determination, the transport vehicle control device 10 performs a control to prohibit transfer of an article W to this lower placement section 52, for example.

Other Embodiments (1) The above embodiment has described an example configuration in which the advance-retreat direction D is parallel to the width direction Y. However, there is not limitation to this configuration. The advance-retreat direction D may alternatively intersect the width direction Y.

(2) The above embodiment has described an example configuration in which the rack-side coupler 54, which faces one side corresponding to the travel rails 1 in the advance-retreat direction D, and the transport vehicle-side coupler 27, which faces the other side corresponding to the holding rack 3 in the advance-retreat direction D, are coupled to each other while facing each other in the advance-retreat direction D in response to the transport vehicle 2 being stopped at the stop position P that is set in correspondence with the holding rack 3. However, there is no limitation to this configuration. The rack-side coupler 54 and the transport vehicle-side coupler 27 need only be coupled to each other in response to the transport vehicle 2 being stopped at the stop position P. Accordingly, the rack-side coupler 54 and the transport vehicle-side coupler 27 may face each other in the travel direction X and coupled as a result of the at least one of the rack-side coupler 54 and the transport vehicle-side coupler 27 advances in the advance-retreat direction D while the transport vehicle 2 is stopped at the stop position P, for example.

(3) The above embodiment has described an example configuration in which the rack-side coupler 54 rotates about the second rotation axis AX2, which is a rotation axis parallel to the advance-retreat direction D, and the transport vehicle-side coupler 27 rotates about the third rotation axis AX3, which is a rotation axis parallel to the advance-retreat direction D. However, there is no limitation to this configuration. For example, at least one of the rack-side coupler 54 and the transport vehicle-side coupler 27 may rotate about a rotation axis parallel to the vertical direction Z.

(4) The above embodiment has described an example configuration in which the transport vehicle-side coupler 27 and the rack-side coupler 54 are magnet gears capable of being contactlessly coupled to each other through magnetic force and transmitting driving force. However, there is no limitation to this configuration. For example, the transport vehicle-side coupler 27 and the rack-side coupler 54 may be meshing members such as a pair of gears or dog clutches, and may be capable of transmitting driving force by engaging with each other.

(5) The above embodiment has described an example in which the drive transmission mechanism 53 is at least partially arranged in a space between the upper placement section 41 and the lower placement section 52 in the vertical direction Z. However, there is no limitation to this configuration. The entire drive transmission mechanism 53 may be arranged in a space between the upper placement section 41 and the lower placement section 52 in the vertical direction Z. Alternatively, the entire drive transmission mechanism 53 may be arranged at a location other than a space between the upper placement section 41 and the lower placement section 52 in the vertical direction Z.

(6) The above embodiment has described an example configuration in which the fixed supports 51 are detachably attached to the upper shelf section 4. However, there is no limitation to this configuration. The fixed supports 51 may alternatively be fixed to the upper shelf section 4 in an unremovable manner.

(7) The above embodiment has described an example configuration in which the rack drive mechanism 26 is detachably attached to the transport vehicle 2. However, there is no limitation to this configuration. The rack drive mechanism 26 may be fixed to the transport vehicle 2 in an unremovable manner.

(8) The above embodiment has described an example configuration in which the article detector 6 and the advance-retreat detector 7 are provided. However, there is no limitation to this configuration. A configuration without at least one of the article detector 6 and the advance-retreat detector 7 may alternatively be adopted.

(9) The above embodiment has described an example configuration in which the article detector 6 includes a first transmitter/receiver 61 for transmitting and receiving light such as a laser beam. However, there is no limitation to this configuration. For example, the article detector 6 may alternatively be a sensor that detects the weight of an article W placed on the lower placement section 52. Further, the above embodiment has described an example configuration in which the article detector 6 detects whether or not an article W is present on the lower placement section 52 if the lower placement section 52 is in the retreated position (see the lower placement section 52 indicated by solid lines in FIG. 1). However, there is no limitation to this configuration. The article detector 6 may detect whether or not an article W is present on the lower placement section 52 if the lower placement section 52 is in the advanced position (see the lower placement section 52 indicated by long-dash double-dot lines in FIG. 1). In this configuration, the positions and angles of the first transmitter/receiver 61 and the first reflective member 62 are set such that light emitted from the light projector of the first transmitter/receiver 61 is reflected by the first reflective member 62 and received by the light receiver of the first transmitter/receiver 61 if the lower placement section 52 is in the advanced position.

(10) The above embodiment has described an example configuration in which the advance-retreat detector 7 includes a second transmitter/receiver 71 for transmitting and receiving light such as a laser beam. However, there is no limitation to this configuration. For example, the advance-retreat detector 7 may be a sensor that detects the position of the output member 56 in the advance-retreat direction D. This configuration enables the advance-retreat detector 7 to detect both the lower placement section 52 being in the retreated position and the lower placement section 52 being in the advanced position.

(11) Note that the configuration disclosed in the above embodiment can also be applied in combination with configurations disclosed in other embodiments as long as no contradiction arises. Regarding other configurations as well, the embodiment disclosed in the present specification is merely an example in all respects.

Accordingly, various modifications can be made as appropriate without departing from the gist of the present disclosure.

Summary of The Above Embodiment

The following is the summary of the above-described article transfer facility.

An article transport facility includes:
a travel rail on a ceiling;
a transport vehicle configured to travel along the travel rail and transport an article; and
a holding rack adjacent to the travel rail and configured to hold the article,
the transport vehicle including:
a holder configured to suspend and hold the article;
a lift mechanism configured to move the holder in a vertical direction;
a lateral movement mechanism configured to move the holder in a width direction, which is, as viewed in the vertical direction, a direction intersecting a travel direction parallel to the travel rail; and
a rack drive mechanism,
the holding rack including:
an upper shelf section suspended from the ceiling; and
a lower shelf section suspended from the upper shelf section,
the upper shelf section including an upper placement section which is fixed to the ceiling and on which the article is placeable,
the lower shelf section including:
a fixed support fixed to the upper shelf section;
a lower placement section on which the article is placeable, the lower placement section being supported by the fixed support in such a manner as to be capable of advancing and retreating in an advance-retreat direction, which is a direction in which the lower placement section moves toward and away from the travel rail as viewed in the vertical direction; and
a drive transmission mechanism drivable by the rack drive mechanism to cause the lower placement section to advance and retreat,
wherein the lower placement section is positioned directly below the upper placement section while in a retreated position, in which the lower placement section is away from the travel rail,
the lower placement section is positioned directly below the travel rail while in an advanced position, in which the lower placement section is close to the travel rail,
the lower placement section is below a lower end of the transport vehicle, and
the rack drive mechanism is below a lower end of the article held by the holder positioned at an uppermost side within a range within which the holder is moved by the lift mechanism.

According to this configuration, the lower placement section, which advances and retreats in the advance-retreat direction, is below the lower end of the transport vehicle. Further, the rack drive mechanism is below the lower end of the article that is held by the holder positioned at the uppermost side in the movable range of the holder that is moved by the if lift mechanism. This configuration makes it easy to arrange the drive transmission mechanism, which is driven by the rack drive mechanism to cause the lower placement section to advance and retreat, at a position close to the lower placement section in the vertical direction. It is therefore easy to keep short the vertical length of the drive transmission mechanism for causing the lower placement section to advance and retreat.

Here, it is preferable that the drive transmission mechanism includes a rack-side coupler facing one side corresponding to the travel rail in the advance-retreat direction,
the rack drive mechanism includes a transport vehicle-side coupler facing another side corresponding to the holding rack in the advance-retreat direction,
the rack-side coupler and the transport vehicle-side coupler are configured to be coupled to each other while facing each other in the advance-retreat direction in response to the transport vehicle being stopped at a stop position that is set in correspondence with the holding rack, and
the rack drive mechanism drives the drive transmission mechanism via the rack-side coupler and the transport vehicle-side coupler that are coupled to each other.

According to this configuration, the rack drive mechanism can appropriately drive the drive transmission mechanism with the rack-side coupler and the transport vehicle-side coupler being coupled to each other while facing each other in the advance-retreat direction in response to the transport vehicle being stopped at a stop position that is set in correspondence with the holding rack.

In a configuration in which the drive transmission mechanism includes the rack-side coupler, and the rack drive mechanism includes the transport vehicle-side coupler, it is preferable that the rack drive mechanism includes a drive source configured to drive the transport vehicle-side coupler to rotate about a rotation axis parallel to the advance-retreat direction, the rack-side coupler is configured to be rotated about a rotation axis parallel to the advance-retreat direction by driving force transmitted from the drive source via the transport vehicle-side coupler, and the drive transmission mechanism includes:
a conversion mechanism configured to convert rotation of the rack-side coupler to linear motion in the advance-retreat direction;
an output member configured to be moved linearly by the conversion mechanism; and
a joint joining the output member to the lower placement section.

According to this configuration, the rack-side coupler of the drive transmission mechanism rotates about the rotation axis parallel to the advance-retreat direction. Further, the output member of the drive transmission mechanism is moved linearly in the advance-retreat direction by the conversion mechanism. This configuration makes it easy to keep short the length of the drive transmission mechanism in the vertical direction, which is orthogonal to the advance-retreat direction.

Furthermore, according to this configuration, the transport vehicle-side coupler of the rack drive mechanism rotates about the rotation axis parallel to the advance-retreat direction. This configuration makes it easy to keep short the length of the rack drive mechanism in the vertical direction, which is orthogonal to the advance-retreat direction.

It is preferable that the drive transmission mechanism is at least partially disposed in a space between the upper placement section and the lower placement section in the vertical direction.

According to this configuration, at least a part of the drive transmission mechanism can be arranged with use of a space between the upper placement section and the lower placement section in the vertical direction. This configuration suppresses an increase in the vertical size of the holding rack caused by providing a drive transmission mechanism.

It is preferable that the fixed support of the lower placement section is detachably attached to the upper shelf section.

This configuration enables the lower placement section to be an attachable and detachable unit. This makes it easy to disassemble, assemble, and transport the holding rack, for example.

Further, according to this configuration, a holding rack without a lower shelf section can be easily made in the case where the lower shelf section is not necessary, or in the case where there is no space for arranging the lower shelf section, for example. Accordingly, a holding rack with a versatile configuration can be made.

It is preferable that the rack drive mechanism is detachably attached to the transport vehicle.

This configuration enables the rack drive mechanism to be an attachable and detachable unit. This makes it easy to disassemble, assemble, and transport the transport vehicle, for example.

Further, according to this configuration, a transport vehicle without a rack drive mechanism can be easily made in accordance with a configuration in which the holding rack does not have a lower shelf section, for example.

It is preferable that the article transport facility further includes an article detector configured to detect whether or not the article is present on the lower placement section, wherein the article detector is attached to the rack drive mechanism.

According to this configuration, it can be appropriately detected whether an article is placed on the lower placement section.

Further, according to this configuration, the article detector and the rack drive mechanism can be easily integrated into a single unit.

It is preferable that the article transport facility further includes an advance-retreat detector configured to detect at least either the lower placement section being in the retreated position or the lower placement section being in the advanced position, wherein the advance-retreat detector is attached to the rack drive mechanism.

According to this configuration, the position of the lower placement section in the advance-retreat direction can be detected appropriately.

Further, according to this configuration, the advance-retreat detector and the rack drive mechanism can be easily integrated into a single unit.

An article transport facility includes:
a travel rail on a ceiling;
a transport vehicle configured to travel along the travel rail and transport an article; and
a holding rack adjacent to the travel rail and configured to hold the article,
the transport vehicle including:
a holder configured to suspend and hold the article;
a lift mechanism configured to move the holder in a vertical direction;
a lateral movement mechanism configured to move the holder in a width direction, which is, as viewed in the vertical direction, a direction intersecting a travel direction parallel to the travel rail; and
a rack drive mechanism,
the holding rack including:
an upper shelf section suspended from the ceiling; and
a lower shelf section suspended from the upper shelf section,
the upper shelf section including an upper placement section which is fixed to the ceiling and on which the article is placeable,
the lower shelf section including:
a fixed support fixed to the upper shelf section;
a lower placement section on which the article is placeable, the lower placement section being supported by the fixed support in such a manner as to be capable of advancing and retreating in an advance-retreat direction, which is a direction in which the lower placement section moves toward and away from the travel rail as viewed in the vertical direction; and
a drive transmission mechanism drivable by the rack drive mechanism to cause the lower placement section to advance and retreat,
wherein the lower placement section is positioned directly below the upper placement section while in a retreated position, in which the lower placement section is away from the travel rail,
the lower placement section is positioned directly below the travel rail while in an advanced position, in which the lower placement section is close to the travel rail, the drive transmission mechanism includes a rack-side coupler facing one side corresponding to the travel rail in the advance-retreat direction, the rack drive mechanism includes:
a transport vehicle-side coupler facing another side corresponding to the holding rack in the advance-retreat direction; and
a drive source configured to drive the transport vehicle-side coupler to rotate about a rotation axis parallel to the advance-retreat direction, the rack-side coupler and the transport vehicle-side coupler are configured to be coupled to each other while facing each other in the advance-retreat direction in response to the transport vehicle being stopped at a stop position that is set in correspondence with the holding rack, the rack-side coupler is configured to be rotated about a rotation axis parallel to the advance-retreat direction by driving force transmitted from the drive source via the transport vehicle-side coupler, and the drive transmission mechanism further includes:
a conversion mechanism configured to convert rotation of the rack-side coupler to linear motion in the advance-retreat direction;
an output member configured to be moved linearly by the conversion mechanism; and
a joint joining the output member to the lower placement section.

According to this configuration, the rack-side coupler of the drive transmission mechanism rotates about the rotation axis parallel to the advance-retreat direction. Further, the output member of the drive transmission mechanism is moved linearly in the advance-retreat direction by the conversion mechanism. This configuration makes it easy to keep short the length of the drive transmission mechanism in the vertical direction, which is orthogonal to the advance-retreat direction.

Furthermore, according to this configuration, the transport vehicle-side coupler of the rack drive mechanism rotates about the rotation axis parallel to the advance-retreat direction. This configuration makes it easy to keep short the length of the rack drive mechanism in the vertical direction, which is orthogonal to the advance-retreat direction.

INDUSTRIAL APPLICABILITY

The technique according to the present disclosure can be used for an article transport facility that includes a travel rail installed on a ceiling, a transport vehicle that travels along the travel rail and transports an article, and a holding rack that is arranged adjacent to the travel rail and holds the article.

What is claimed is:
1. An article transport facility comprising:
a travel rail on a ceiling;
a transport vehicle configured to travel along the travel rail and transport an article; and
a holding rack adjacent to the travel rail and configured to hold the article,
the transport vehicle comprising:
a holder configured to suspend and hold the article;
a lift mechanism configured to move the holder in a vertical direction;
a lateral movement mechanism configured to move the holder in a width direction, which is, as viewed in the vertical direction, a direction intersecting a travel direction parallel to the travel rail; and
a rack drive mechanism, the holding rack comprising:
an upper shelf section suspended from the ceiling; and
a lower shelf section suspended from the upper shelf section,
the upper shelf section comprising an upper placement section which is fixed to the ceiling and on which the article is placeable,
the lower shelf section comprising:
a fixed support fixed to the upper shelf section;
a lower placement section on which the article is placeable, the lower placement section supported by the fixed support in such a manner as to be capable of advancing and retreating in an advance-retreat direction, which is a direction in which the lower placement section moves toward and away from the travel rail as viewed in the vertical direction; and
a drive transmission mechanism drivable by the rack drive mechanism to cause the lower placement section to advance and retreat,
wherein:
the lower placement section is positioned directly below the upper placement section while in a retreated position, in which the lower placement section is away from the travel rail,
the lower placement section is positioned directly below the travel rail while in an advanced position, in which the lower placement section is close to the travel rail,
the lower placement section is below a lower end of the transport vehicle, and
the rack drive mechanism is below a lower end of the article held by the holder positioned at an uppermost side within a range within which the holder is moved by the lift mechanism.

2. The article transport facility according to claim 1, wherein:
the drive transmission mechanism comprises a rack-side coupler facing one side corresponding to the travel rail in the advance-retreat direction,
the rack drive mechanism comprises a transport vehicle-side coupler facing another side corresponding to the holding rack in the advance-retreat direction,
the rack-side coupler and the transport vehicle-side coupler are configured to be coupled to each other while facing each other in the advance-retreat direction in response to the transport vehicle being stopped at a stop position that is set in correspondence with the holding rack, and
the rack drive mechanism drives the drive transmission mechanism via the rack-side coupler and the transport vehicle-side coupler that are coupled to each other.

3. The article transport facility according to claim 2, wherein the rack drive mechanism comprises a drive source configured to drive the transport vehicle-side coupler to rotate about a rotation axis parallel to the advance-retreat direction,
wherein the rack-side coupler is configured to be rotated about a rotation axis parallel to the advance-retreat direction by driving force transmitted from the drive source via the transport vehicle-side coupler, and
wherein the drive transmission mechanism further comprises:
a conversion mechanism configured to convert rotation of the rack-side coupler to linear motion in the advance-retreat direction;
an output member configured to be moved linearly by the conversion mechanism; and a joint joining the output member to the lower placement section.

4. The article transport facility according to claim 1, wherein the drive transmission mechanism is at least partially disposed in a space between the upper placement section and the lower placement section in the vertical direction.

5. The article transport facility according to claim 1, wherein the fixed support of the lower placement section is detachably attached to the upper shelf section.

6. The article transport facility according to claim 1, wherein the rack drive mechanism is detachably attached to the transport vehicle.

7. The article transport facility according to claim 1, further comprising:
an article detector configured to detect whether the article is present on the lower placement section,
wherein the article detector is attached to the rack drive mechanism.

8. The article transport facility according to claim 1, further comprising:
an advance-retreat detector configured to detect at least either the lower placement section being in the retreated position or the lower placement section being in the advanced position, and
wherein the advance-retreat detector is attached to the rack drive mechanism.

9. An article transport facility comprising:
a travel rail on a ceiling;
a transport vehicle configured to travel along the travel rail and transport an article; and
a holding rack adjacent to the travel rail and configured to hold the article,
the transport vehicle comprising:
    a holder configured to suspend and hold the article;
    a lift mechanism configured to move the holder in a vertical direction;
    a lateral movement mechanism configured to move the holder in a width direction, which is, as viewed in the vertical direction, a direction intersecting a travel direction parallel to the travel rail; and
    a rack drive mechanism,
the holding rack comprising:
    an upper shelf section suspended from the ceiling; and
    a lower shelf section suspended from the upper shelf section,
the upper shelf section comprising an upper placement section which is fixed to the ceiling and on which the article is placeable,
the lower shelf section comprising:
    a fixed support fixed to the upper shelf section;
    a lower placement section on which the article is placeable, the lower placement section supported by the fixed support in such a manner as to be capable of advancing and retreating in an advance-retreat direction, which is a direction in which the lower placement section moves toward and away from the travel rail as viewed in the vertical direction; and
    a drive transmission mechanism drivable by the rack drive mechanism to cause the lower placement section to advance and retreat,
wherein:
the lower placement section is positioned directly below the upper placement section while in a retreated position, in which the lower placement section is away from the travel rail,
the lower placement section is positioned directly below the travel rail while in an advanced position, in which the lower placement section is close to the travel rail,
the drive transmission mechanism comprises a rack-side coupler facing one side corresponding to the travel rail in the advance-retreat direction,
the rack drive mechanism comprises:
    a transport vehicle-side coupler facing another side corresponding to the holding rack in the advance-retreat direction; and
    a drive source configured to drive the transport vehicle-side coupler to rotate about a rotation axis parallel to the advance-retreat direction,
the rack-side coupler and the transport vehicle-side coupler are configured to be coupled to each other while facing each other in the advance-retreat direction in response to the transport vehicle being stopped at a stop position that is set in correspondence with the holding rack,
the rack-side coupler is configured to be rotated about a rotation axis parallel to the advance-retreat direction by driving force transmitted from the drive source via the transport vehicle-side coupler, and
the drive transmission mechanism further comprises:
    a conversion mechanism configured to convert rotation of the rack-side coupler to linear motion in the advance-retreat direction;
    an output member configured to be moved linearly by the conversion mechanism; and
    a joint joining the output member to the lower placement section.

* * * * *